United States Patent [19]

Reeves et al.

[11] Patent Number: 5,742,643
[45] Date of Patent: Apr. 21, 1998

[54] QUANTIZING AND DECODING OF PHASE-AMPLITUDE MODULATED SIGNALS IN HEXAGONAL CODE

[75] Inventors: Philip J. Reeves, Burlington; Harald A. Wougk, Franklin Park, both of N.J.

[73] Assignee: Mikros Systems Corporation, Princeton, N.J.

[21] Appl. No.: 344,344

[22] Filed: Nov. 22, 1994

[51] Int. Cl.$^6$ .................................................. H04B 14/04
[52] U.S. Cl. .................................. 375/243; 375/340
[58] Field of Search ............................. 375/243, 261, 375/262, 264, 265, 340, 341, 350; 329/304; 371/43

[56] References Cited

U.S. PATENT DOCUMENTS

| | | | |
|---|---|---|---|
| 4,562,425 | 12/1985 | Turner et al. | 375/261 |
| 4,727,534 | 2/1988 | Debus, Jr. et al. | 370/20 |
| 5,214,672 | 5/1993 | Eyuboglu et al. | 375/254 |
| 5,311,547 | 5/1994 | Wei | 375/290 |

OTHER PUBLICATIONS

M.K. Simon et al., "Hexagonal Multiple Phase-and-Amplitude-Shift-Keyed Signal Sets", IEEE Transactions on Communications, vol. COM–21 (1973), pp. 1108–1115.

W.H. Mow, "Faxt Decoding of the Hexagonal Lattice with Applications to Power Efficient Multi–level Modulation Systems".

Primary Examiner—Stephen Chin
Assistant Examiner—Don Vo
Attorney, Agent, or Firm—Brumbaugh, Graves, Donohue & Raymond

[57] ABSTRACT

In digital communications over a limited-bandwidth channel such as a radio-broadcast channel, multiple phase-amplitude shift keyed (MPASK) modulation is preferred using close packed hexagonal code. In quantizing such signals, a representation of an equalized received signal is transformed such that, to each symbol of the constellation, there corresponds a respective point on a square grid. A symbol of the constellation is determined as a quantized representative of the received signal by its selection as the one or the other of two symbols of the constellation having transformed representations at vertices of the square or rectangle in which the transformed signal lies. Such quantizing can be performed at a rate which is independent of the size of the constellation, and can be combined with similarly advantageous decoding in a receiver.

15 Claims, 7 Drawing Sheets

QUANTIZING AND DECODING OF PHASE-AMPLITUDE MODULATED SIGNALS IN HEXAGONAL CODE

BACKGROUND OF THE INVENTION

The invention relates to the quantizing and decoding of signals in digital communications.

Typically, in the transmission of digital or digitized information, a digital signal modulates a high-frequency sinusoidal carrier in a sequentially timed or keyed fashion. The digital data values are transmitted at discrete points in time, at integer multiples of a time interval. In basic schemes, modulation is of a single parameter of the sinusoidal carrier such as amplitude, frequency or phase, respectively designated as amplitude shift keyed (ASK), frequency shift keyed (FSK) and phase shift keyed (PSK) modulation.

The discrete values of a modulated parameter are called symbols, and the number of different symbols is usually designated by M, standing for "multiple". Correspondingly, the three basic modulation techniques are generally known as MASK, MFSK and MPSK. For M, a numerical value may be substituted. For example, if phase is the modulated parameter, with 16 equidistant angular values 0, $(2\pi)/16$, $2\cdot(2\pi)/16$, ..., $15\cdot(2\pi)/16$, the modulation technique is called 16-PSK.

Modulation may involve more than one parameter of a carrier. For example, in limited-bandwidth radio-frequency communications, there is particular interest in combined phase-amplitude shift-keyed modulation (MPASK). Symbols may then be represented as points in a complex plane in which each symbol appears as a point whose phase and absolute value correspond to the phase and amplitude of the represented symbol. This plane is called the complex symbol space, and a pattern of symbols in the complex symbol space is called a constellation. The real and imaginary coordinates of a symbol correspond to the real and imaginary parts of a baseband signal.

For transmission, a discrete signal is encoded into a symbol from the constellation, and the symbol is used, e.g., in modulating a broadcast carrier or sub-carrier signal. At the receiver, the symbol is determined by quantizing, i.e., by selecting a symbol from the known constellation in proximity to the received signal.

Figure 2:
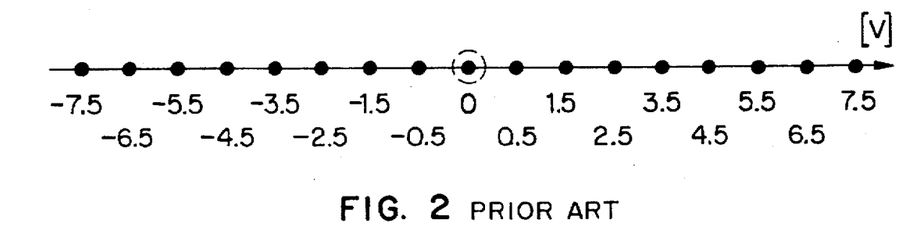
FIG. 2 is a graphic representation of an amplitude shift keyed (ASK) modulation constellation including sixteen symbols.
Figure 3:
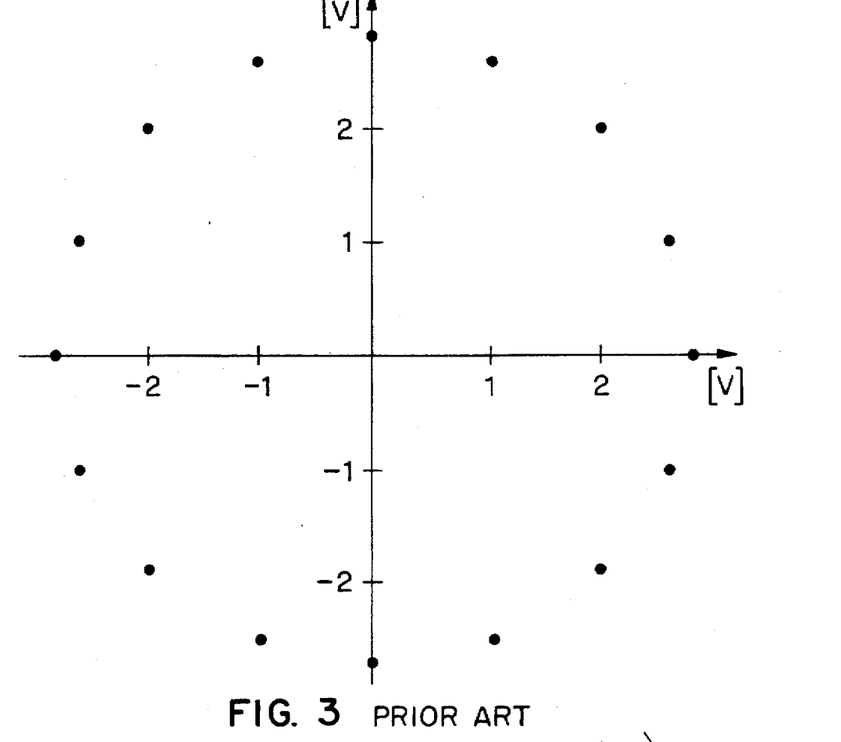
FIG. 3 is a graphic representation of a phase shift keyed (PSK) modulation constellation including sixteen symbols.

A sine wave with constant carrier frequency $f_c$ can be expressed as $$g(t)=a(t)\cdot\sin(2\pi f_c t+\phi(t))$$

where $a(t)$ and $\phi(t)$ are the instantaneous amplitude and phase of the signal $g(t)$. MASK corresponds to constant $\phi$ and variable $a(t)$, with symbol space as illustrated by FIG. 2 for M=16. MPSK corresponds to constant $a$ and variable $\phi(t)$, with symbol space as illustrated by FIG. 3, also for M=16.

Figure 4:
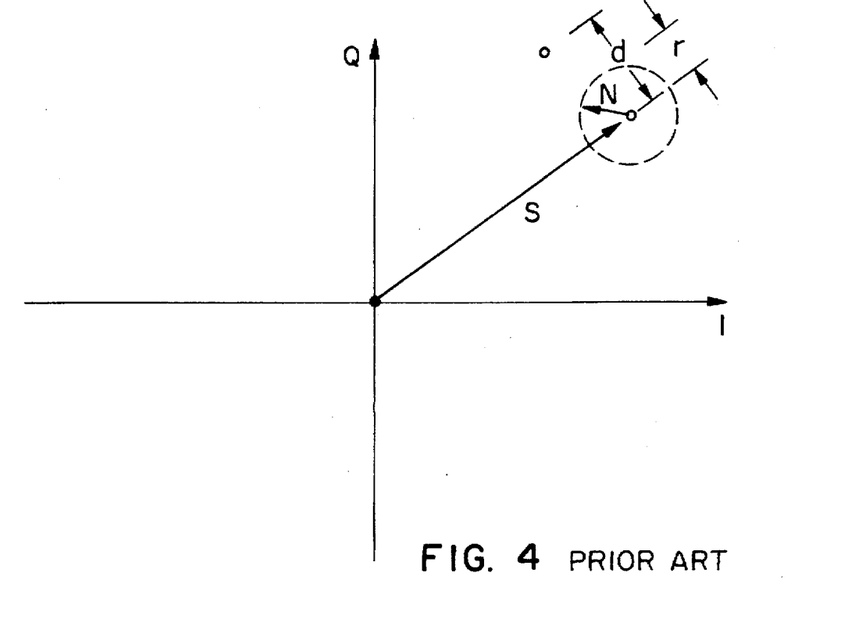
FIG. 4 is a graphic representation in complex symbol space, illustrating a received signal with additive white Gaussian noise (AWGN).

In MASK, MPSK or MPASK, a symbol being transmitted can be considered as a vector from the origin to one of M points in symbol space. Due to extraneous influences in transmission, the received signal may be understood as corrupted by additive white Gaussian noise (AWGN) which vectorially adds to the signal being transmitted. This is illustrated by FIG. 4 where S denotes the symbol vector, N the noise vector, r the magnitude of the noise vector, and d the distance to a neighboring symbol. The noise or error signal can be taken as uniformly distributed in phase from 0 to $2\pi$ and as having magnitude with probability following a Rayleigh distribution defined by $$p(r)=\frac{r}{\sigma^2} e^{-\frac{r^2}{2\sigma^2}}$$

where $\sigma$ is the root mean squared (RMS) noise voltage.

If quantization of a received signal is to the nearest symbol of the constellation, a quantization error occurs when $r>d/2$. The probability of a symbol error is then $$P_E= \int_{\frac{d}{2}}^{\infty} p(r)dr = e^{\frac{-d^2}{8N}}$$

where N is the total noise power. The best error rate performance is obtained by maximizing the distance d between nearest neighbors in symbol space. This distance depends on the RMS signal voltage, the total number of elements N in symbol space, and the method of modulation, e.g., ASK or PSK.

The RMS voltage can be expressed as $$V_{RMS}=\sqrt{\frac{\sum_{i=1}^{M} m(i)^2}{M}}$$

where $m(i)$ is the distance from the origin to the symbol i. Carrying out this computation for ASK and PSK yields $$MASK: V_{RMS}=\frac{dM}{2\sqrt{3}}$$

$$MPSK: V_{RMS}=\frac{d}{2\sin\left(\frac{\pi}{M}\right)}=\frac{dM}{2\pi}$$

Hence, for a given RMS voltage, or signal power, and for a given data rate M, the nearest-neighbor distance is $\pi/3^{1/2} \approx 1.8$ times greater for PSK than for ASK. Alternatively stated, for a given separation, or error rate, PSK performs the same as ASK but at 5 dB lower signal-to-noise ratio (SNR). A third way of stating the above is that for a given error rate and SNR, 1.82 more bits per second can be reliably sent through a link with PSK. This explains why PSK is preferred over ASK in higher-quality digital communication systems. The tradeoff has been cost, as it has been easier and less expensive to measure amplitude than phase.

For MPASK, different types of constellations have been used. In one simple technique, known as quadrature amplitude modulation (QAM), the symbols are taken from a predetermined rectangular constellation in complex symbol space. With affordable high-performance devices, more elaborate modulation schemes can be implemented. The task then is to find a superior modulation scheme, given the freedom to choose the constellation of M points at arbitrary points in the complex symbol plane.

Figure 5:
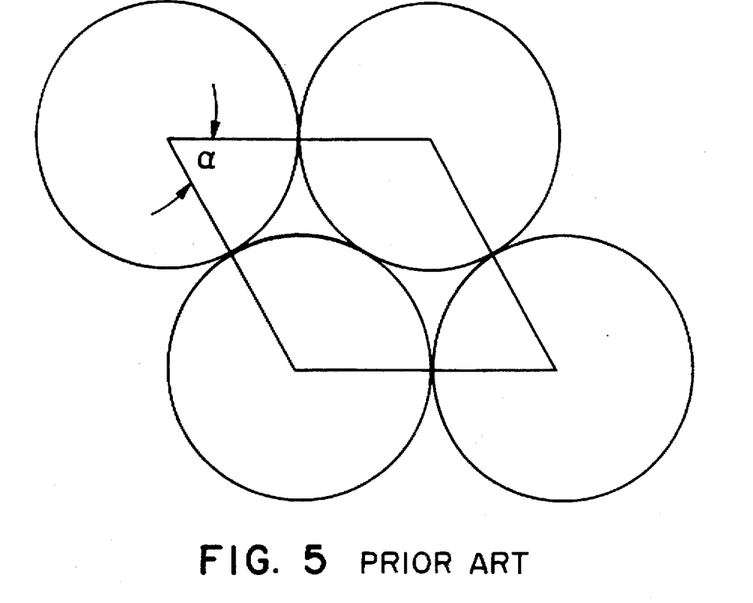
FIG. 5 is a diagram of four symbols in a hexagonal close packed configuration.

For optimized performance, the average power (or the mean squared distance from the origin of the M points in the constellation) should be minimized for a given separation d of the points from their nearest neighbors. Referring to the constellation shown in FIG. 5, this is equivalent to maximizing the density of circles of radius d/2 in symbol space. This occurs when the circles are "hexagonal close packed", in which case the angle $\alpha$ is 60°. In hexagonal close packed constellation, each symbol is separated from six nearest neighbors by the same distance d. No other possible choice of M symbols results in a larger separation for a particular average power.

The following papers concern quantizing for hexagonal constellations:

M. K. Simon et al., "Hexagonal Multiple Phase-and-Amplitude-Shift-Keyed Signal Sets", IEEE Transactions on Communications, Vol. COM-21 (1973), pp. 1108–1115;

W. H. Mow, "Fast Decoding of the Hexagonal Lattice with Applications to Power Efficient Multi-level Modulation Systems".

SUMMARY OF THE INVENTION

In quantizing signals representing symbols of a hexagonal close packed constellation, a representation of an equalized received signal is transformed such that, to each symbol of the constellation, there corresponds a respective point on a square grid, i.e., a regular grid in which gridpoints are at intersections of two mutually orthogonal sets of lines parallel to respective ordinate axes in transformed symbol space. As a quantized representative of the received signal, a symbol is selected as the one or the other of two symbols of the constellation having transformed representations at vertices of the square or rectangle in which the transformed signal lies.

Preferred quantizing can be performed at a rate which is independent of the size of the constellation, and can be combined with similarly advantageous decoding in a receiver.

DETAILED DESCRIPTION OF PREFERRED EMBODIMENTS

Figure 1:
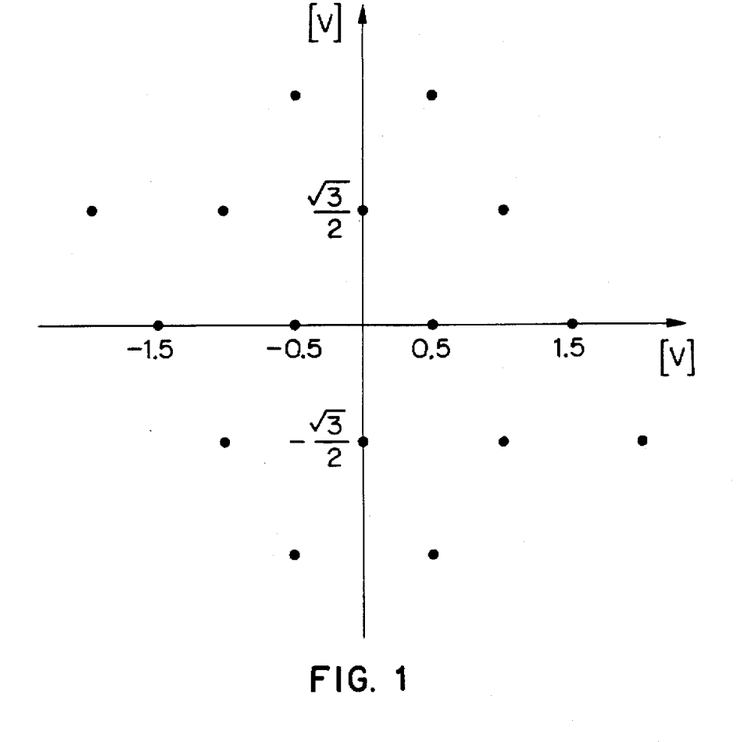
FIG. 1 is a graphic representation of a hexagonal close packed (HCP) phase-amplitude modulation constellation including sixteen symbols.

In preferred phase-amplitude modulation, symbols for transmission are chosen from a hexagonal close packed (HCP) phase-amplitude constellation, e.g., as illustrated by the 16-symbol constellation of FIG. 1. The real and imaginary axes of complex symbol space represent signals measured in volts. The squared distance or amplitude of the symbol from the origin at 0 volts is proportional to the power. Thus, the smaller the average distance, or effective radius $R_{ef}$ of all the symbols, the less power is required in transmission.

Figure 6:
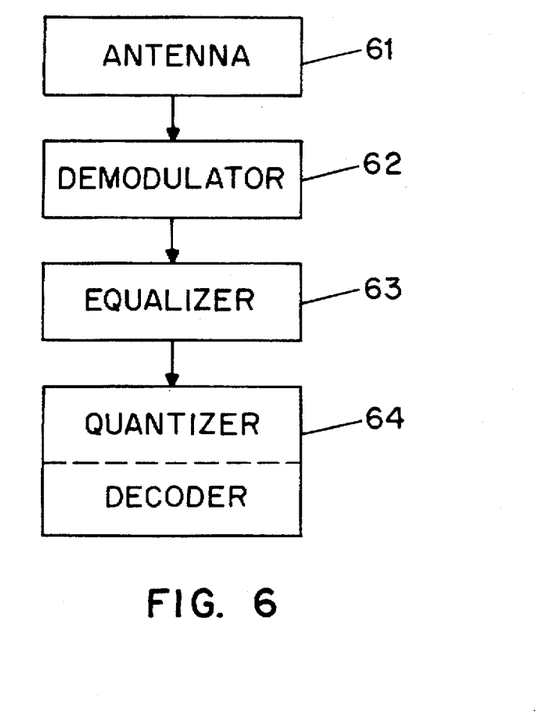
FIG. 6 is a schematic of a receiver in accordance with a preferred embodiment of the invention.

A transmitted signal is received by a receiver as schematically shown in FIG. 6. The receiver includes a receiving antenna 61, demodulator 62, equalizer 63 and quantizer-decoder 64.

Typically in contemplated applications at high data rates, the received signal is a frequency-modulated signal. Two specific examples of high data rate transmission and reception occur in the FM and TV broadcast bands, respectively. In the case of FM, in a Subsidiary Communications Authorization (SCA), the Federal Communications Commission (FCC) has authorized the use of multiplex sub-carriers for data transmission in the 53 to 99 kHz band, above the main carrier; see 47 C.F.R. § 73.319. In the TV broadcast band, the FCC has authorized the use of specific scanning lines in the vertical blanking interval (VBI) for data transmission; see 47 C.F.R. § 73,682.

The frequency-modulated signal is received from a transmitter where the phase-amplitude-modulated baseband signal is used to modulate a carrier signal. Demodulation yields a baseband signal which differs from the signal used at the transmitter, depending on transmission quality.

Equalization includes normalization of the demodulated signal with respect to the average power of the constellation. Equalization removes anomalies, with the exception of AWGN, which are a product of the transmission channel.

Conveniently, the quantizer-decoder may be implemented as a stored-program processor with memory. Equalized complex signals are received into processor memory which further includes information for use by the processor in quantizing and decoding.

Figure 7:
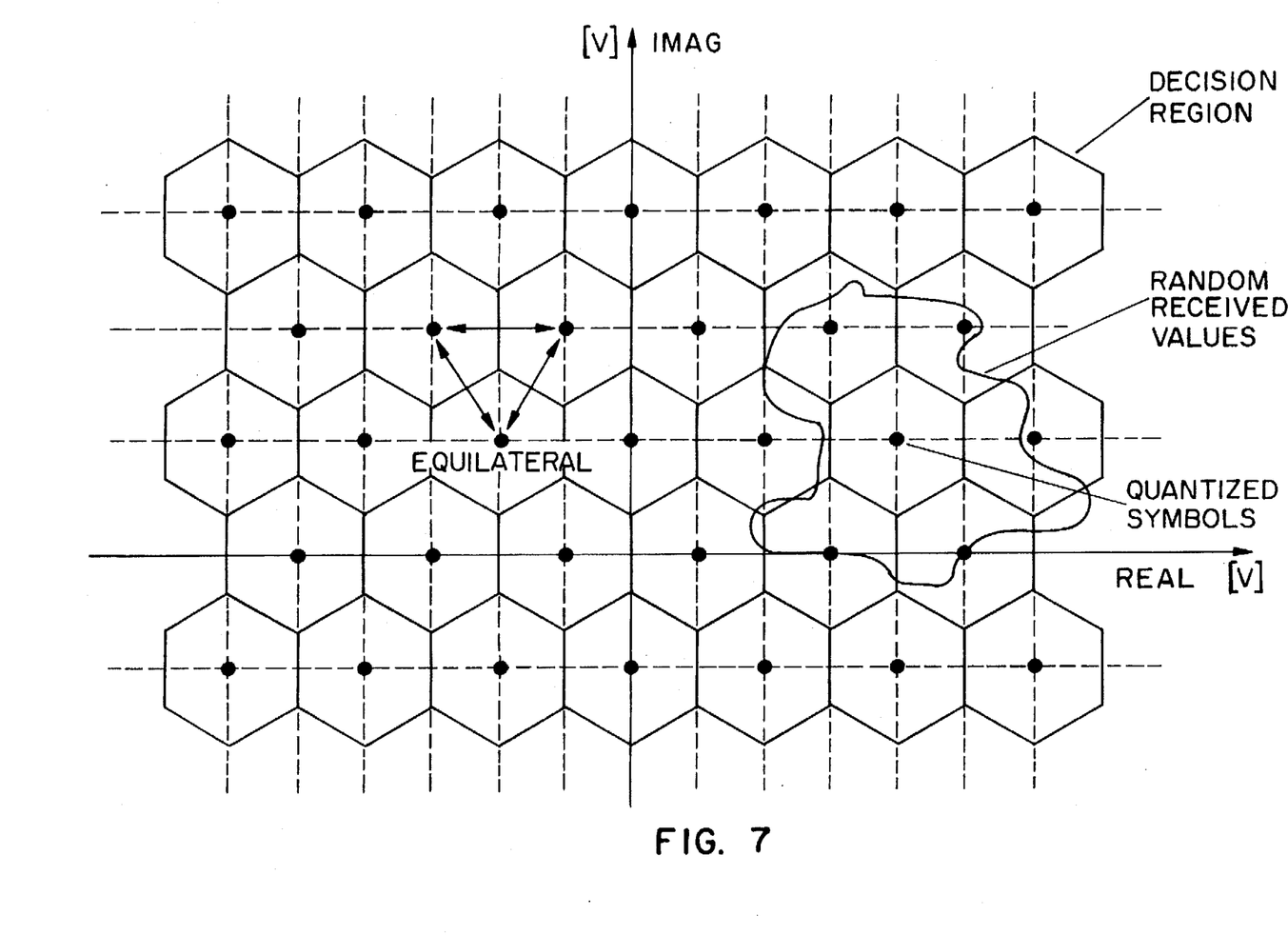
FIG. 7 is a graphic representation of a hexagonal close packed constellation of symbols, and of associated decision regions.

For quantizing in accordance with a preferred embodiment of the invention, a regular hexagonal "decision region" is defined around each point of the constellation in complex symbol space as illustrated by FIG. 7. A signal received in a decision region will be quantized to the value of the symbol at the center of the region. The symbols of the constellation are separated from their nearest neighbors by a distance which, for purposes of the following description and without loss of generality, is taken as unity.

Figure 8:
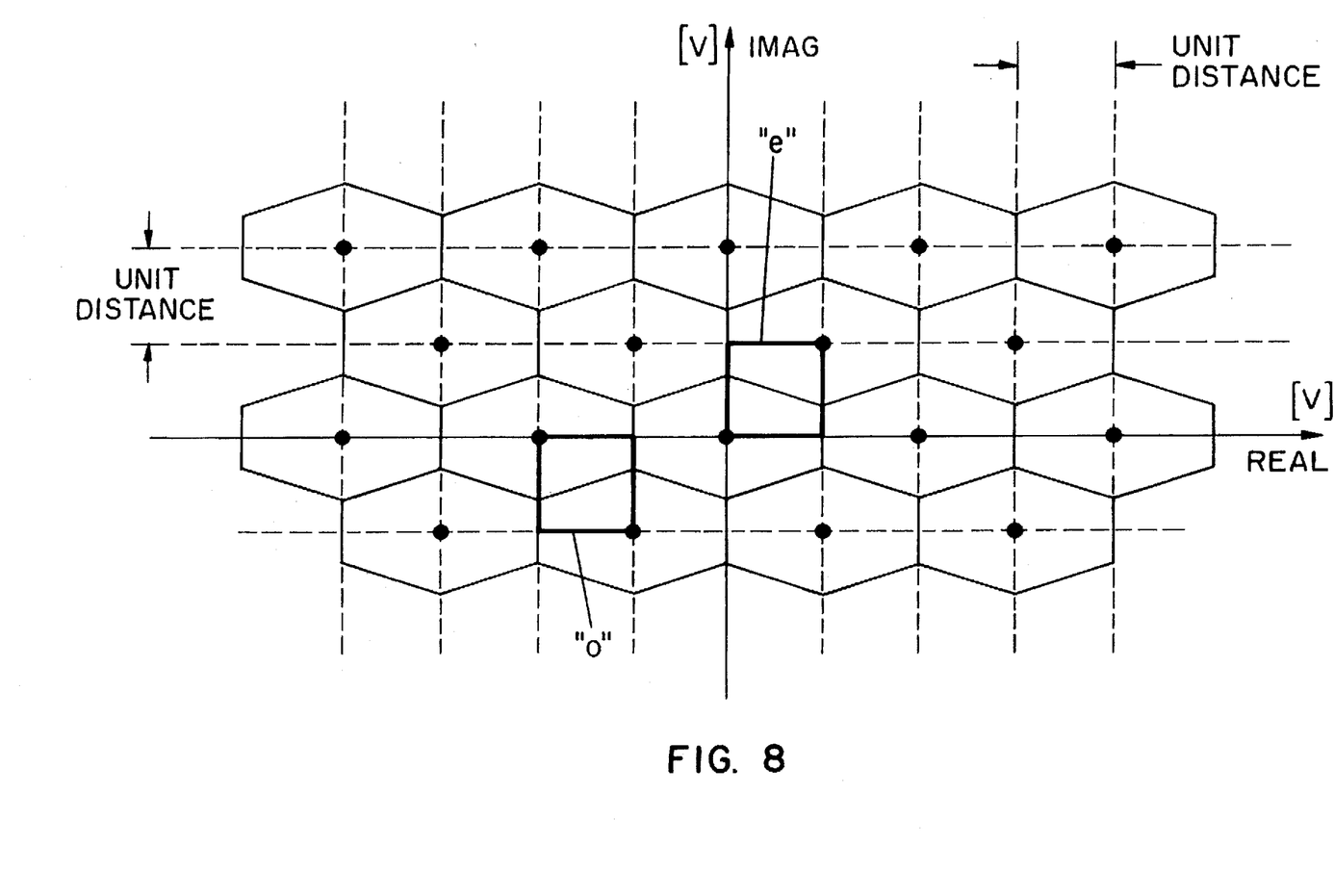
FIG. 8 is a graphic representation of a rescaled hexagonal constellation for quantization in accordance with a preferred embodiment of the invention.
Figure 9:
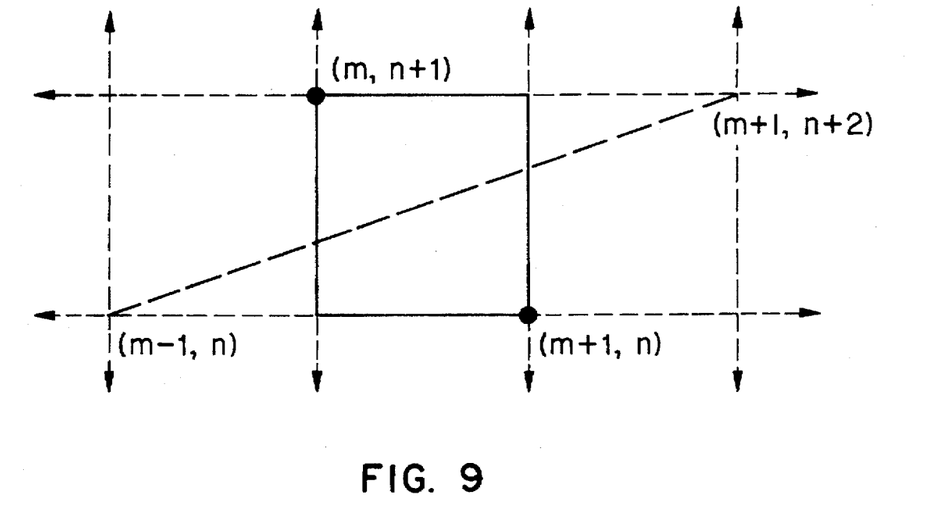
FIGS. 9 and 10 are enlarged representations of portions of FIG. 8.
Figure 10:
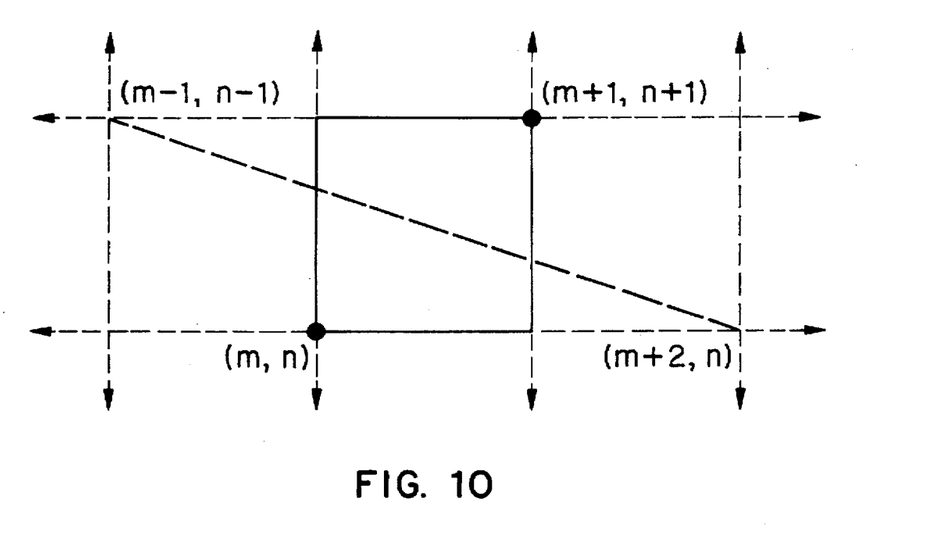
Figure 11:
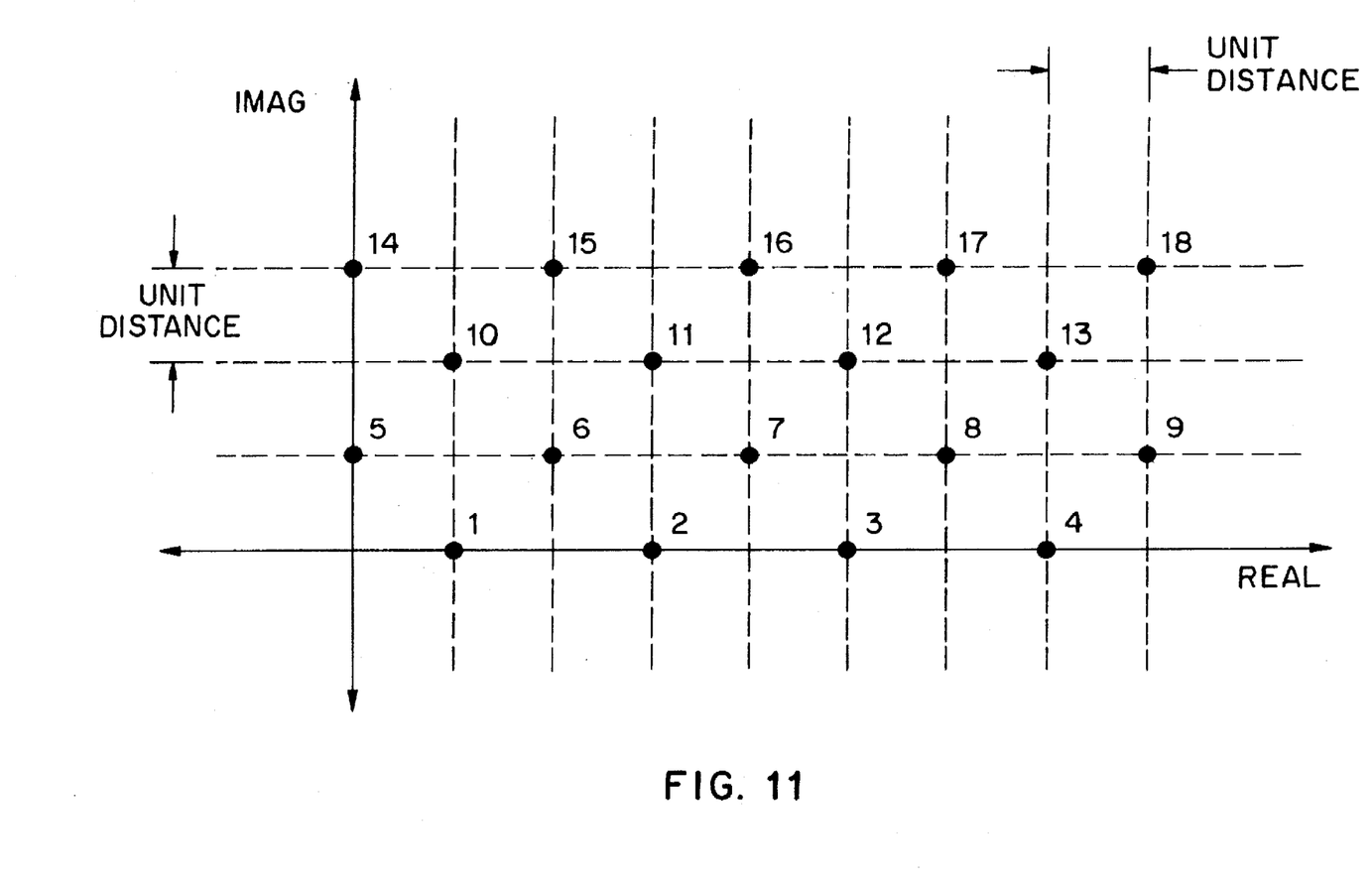
FIG. 11 is a graphic representation of table lookup for decoding a quantized signal in accordance with a preferred embodiment of the invention.

Quantizing is with reference to a transformed symbol space in which the transformed symbols of the constellation have integer-valued coordinates in both the real and imaginary axes. Transformed hexagons with transformed symbols at their center are illustrated in FIG. 8. The integer-valued coordinates of the transformed symbols define naturally occurring unit-square regions which cover the transformed constellation. Each such unit square has two opposite vertices each of which coincides with a transformed symbol. Two such unit squares or "blocks" are shown in FIG. 8, designated "o" and "e", respectively standing for "odd" and "even" as explained below. In FIGS. 9 and 10, respectively, these unit squares are shown on a larger scale, with a broken line corresponding to a critical boundary between decision regions of interest, and with vertices emphasized which correspond to transformed symbols. It is apparent from FIGS. 9 and 10 that the critical boundaries have slope ⅓ in magnitude.

Each equalized received signal is transformed in the same manner as the hexagonal constellation. With reference to FIGS. 9 and 10, with the transformed signal lying either in an odd block or in an even block, the signal is quantized to that corner symbol of the block which lies on the same side of the decision-region-boundary line. Conveniently, this decision can be made on the basis of a comparison of slopes.

In the following more detailed description of a preferred embodiment of the invention, symbols and equalized received signals are represented by complex numbers z, with the real part Re(z) representing the real, in-phase portion and the imaginary part Im(z) representing the part which is orthogonal to the real part. Both the real and imaginary parts represent voltages.

The predetermined hexagonal constellation is transformed by first subtracting 1 from its real part and then doubling the result, and by multiplying its imaginary part by $\frac{2}{3}^{1/2}$. The transformed constellation is translated by adding a value X to the real part and a value Y to the imaginary part. The values of X and Y are positive integers and are chosen such that all symbols in the translated constellation, as well as all expected equalized signals lie at points in the first quadrant. The symbols of the translated constellation correspond to points having non-negative integer real and imaginary parts.

A system of unit-square regions is superimposed over the rescaled hexagonal coordinate system. Each region has four vertices (m,n), (m+1,n), (m+1,n+1) and (m,n+1) where m is the real part and n is the imaginary part of its lower-left vertex. In each of FIGS. 9 and 10, such a region is outlined with a solid line, with relevant opposite vertices (m+1, n) and (m, n+1) being emphasized in FIG. 9, and relevant alternate opposite vertices (m, n) and (m+1, n+1) being emphasized in FIG. 10. A region is categorized as an "odd block" if the sum of m and n is an odd integer, and as an "even block" if the sum of m and n is an even integer.

Based on values X and Y, an equalized received signal z with Re(z)=a and Im(z)=b undergoes the same transformation into $a'=2 \cdot (a-1)+X$ $b'=b \cdot (\frac{2}{3}^{1/2})+Y$ The resulting transformed symbol (a',b') lies within the boundaries of a unit square whose lower-left corner is $(m,n)=(\lfloor a' \rfloor, \lfloor b' \rfloor)$, from which the decision as to "odd block" or "even block" is made.

If the block is even, the signal is quantized to (M,N)=(m, n) if 3·(b'−n)>m+2−a', otherwise to (M,N)=(m+1,n+1). This decision can be interpreted as based on a comparison of slopes, between the boundary line and the line connecting the signal point to the point (m+2,n).

If the block is odd, the signal is quantized to (M,N)=(m+1,n) if 3·(b'−n)<−m+1+a', otherwise to (M,N)=(m,n+1). This decision can be interpreted as based on a comparison of slopes, between the boundary line and the line connecting the signal point to the point (m−1,n).

This completes quantization of the signal into (M,N)=(m+p,n+q), where p and q are either 0 or 1. As a benefit of such quantization, signals are processed at a rate which is independent of the number of symbols in the constellation.

While a grid of unit squares is convenient for purposes of description as well as implementation, unit squares have obvious analogues with re-scaled variables. For purposes of visualization, square grids as in FIGS. 8–11 then can be drawn with rectangular unit cells.

For decoding, also at a rate which is independent of the size of the constellation, table look-up can be used. For example, if the maximum value of the real part of any expected equalized signal is $X_{max}$, table look-up into a table T can be effected by means of an index $I=X_{max} \cdot N+M$.

Table locations T(I) which do not correspond to a valid symbol may contain the same binary string as the closest valid symbol.

For specificity in describing preferred embodiments, details are included above which are exemplary, but which, within the scope of the appended claims, can be modified readily by a person skilled in the art. For example, upon interchanging of the roles of real and imaginary parts, a different transformation can be obtained with the same benefits. Also, while a programmed microprocessor is convenient for carrying out transformations and for making decisions, the use of specialized hardware or firmware is not precluded for such purposes, e.g., in the interest of maximized processing speed at high data rates. Further variations within the scope of the claims will be apparent to those skilled in the art.

I/We claim:

1. A method for quantizing signals representing symbols of a hexagonal close packed constellation, comprising:

transforming a representation of an equalized received signal, the transformation being such that, to each symbol of the constellation, there corresponds a respective point on a square grid; and determining a symbol of the constellation as a quantized representative of the received signal, comprising selecting the quantized representative as the one or the other of two symbols of the constellation having transformed representations at opposite vertices of the square/rectangle of the square grid in which the transformed signal lies.

2. The method of claim 1, wherein transforming comprises scaling.

3. The method of claim 1, wherein transforming comprises translating.

4. The method of claim 1, wherein selecting the quantized representative comprises comparing slopes in transformed symbol space.

5. The method of claim 1, wherein:

the square grid has grid points with integer coordinates so that, with the transformed representation of the equalized received signal being at coordinates (a', b') and lying in a unit square having its lower left corner at coordinates (m, n), the opposite vertices are at (m, n) and (m+1, n+1) if m+n is odd, or (m+1, n) and (m, n+1) if m+n is even; and the quantized representative of the received signal for m+n odd is (m+1, n) if 3·(b'−n)<−m+1+a' and (m, n+1) otherwise, and the quantized representative of the received signal for m+n even is (m, n) if 3·(b'−n)>m+2−a' and (m+1, n+1) otherwise.

6. A quantizer for quantizing signals representing symbols of a hexagonal close packed constellation, comprising:

means for transforming a representation of an equalized received signal, the transformation being such that, to each symbol of the constellation, there corresponds a respective point on a square grid; and means for determining a symbol of the constellation as a quantized representative of the received signal, comprising means for selecting the quantized representative as the one or the other of two symbols of the constellation having transformed representations at opposite vertices of the square/rectangle of the square grid in which the transformed signal lies.

7. The quantizer of claim 6, wherein the means for transforming comprises means for scaling.

8. The quantizer of claim 6, wherein the means for transforming comprises means for translating.

9. The quantizer of claim 6, wherein the means for selecting the quantized representative comprises means for comparing slopes in transformed symbol space.

10. The quantizer of claim 6, wherein the square grid has grid points with integer coordinates so that, with the transformed representation of the equalized received signal being at coordinates (a', b') and lying in a unit square having its lower left corner at coordinates (m, n), the opposite vertices are at (m, n) and (m+1, n+1) if m+n is odd, or (m+1, n) and (m, n+1) if m+n is even; and for m+n odd, the means for selecting the quantized representative of the received signal comprises means for selecting (m+1, n) if $3 \cdot (b'-n) < -m+1a'$ and (m, n+1) otherwise, and for m+n even, the means for selecting the quantized representative of the received signal comprises means for selecting (m, n) if $3 \cdot (b'-n) > m+2-a'$ and (m+1, n+1) otherwise.

11. A receiver for signals representing symbols of a hexagonal close packed constellation, comprising serially connected:

a demodulator;

an equalizer;

means for transforming a representation of an equalized signal, the transformation being such that, to each symbol of the constellation, there corresponds a respective point on a square grid; and means for determining a symbol of the constellation as a quantized representative of the received signal, comprising selecting the quantized representative as the one or the other of two symbols of the constellation having transformed representations at opposite vertices of the square/rectangle of the square grid in which the transformed signal lies.

12. The receiver of claim 11, further comprising decoder means for decoding the quantized representative.

13. The receiver of claim 12, wherein the decoder means comprises table look-up means.

14. The receiver of claim 11, sensitive to FM transmissions in which a multiplex sub-carrier is modulated as authorized pursuant to 47 C.F.R. § 73.319.

15. The receiver of claim 11, sensitive to TV transmissions in which data is inserted in specific scanning lines in a vertical blanking interval as authorized pursuant to 47 C.F.R. § 73.682.

* * * * *